United States Patent
Grapov et al.

(10) Patent No.: US 11,364,572 B2
(45) Date of Patent: Jun. 21, 2022

(54) LASER CUTTING HEAD WITH DUAL MOVABLE MIRRORS PROVIDING BEAM ALIGNMENT AND/OR WOBBLING MOVEMENT

(71) Applicant: IPG Photonics Corporation, Oxford, MA (US)

(72) Inventors: Yuri Grapov, Sutton, MA (US); Kris Pruyn, Tyngsboro, MA (US); Felix Stukalin, Southborough, MA (US); Erik Hinrichsen, Brighton, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 120 days.

(21) Appl. No.: 16/076,151

(22) PCT Filed: Feb. 13, 2017

(86) PCT No.: PCT/US2017/017677
§ 371 (c)(1),
(2) Date: Aug. 7, 2018

(87) PCT Pub. No.: WO2017/139769
PCT Pub. Date: Aug. 17, 2017

(65) Prior Publication Data
US 2018/0369964 A1 Dec. 27, 2018

Related U.S. Application Data

(60) Provisional application No. 62/294,744, filed on Feb. 12, 2016.

(51) Int. Cl.
*B23K 26/38* (2014.01)
*B23K 26/06* (2014.01)
(Continued)

(52) U.S. Cl.
CPC ............ *B23K 26/38* (2013.01); *B23K 26/044* (2015.10); *B23K 26/0643* (2013.01);
(Continued)

(58) Field of Classification Search
CPC .. B23K 26/26; B23K 26/082; B23K 26/0643; B23K 26/044; B23K 26/244
See application file for complete search history.

(56) References Cited

U.S. PATENT DOCUMENTS 3,471,215 A 10/1969 Snitzer
4,614,868 A 9/1986 Alster
(Continued)

FOREIGN PATENT DOCUMENTS

EP 2708307 3/2014
JP 57167692 10/1982
(Continued)

OTHER PUBLICATIONS

Communication from US Patent Office dated Jul. 2, 2019 regarding third-party submission under 37 CFR 1.290 received (2 pages).
(Continued)

*Primary Examiner* — John J Norton
(74) *Attorney, Agent, or Firm* — Grossman, Tucker, Perreault & Pfleger, PLLC

(57) ABSTRACT

A laser cutting head with movable mirrors may be used to move a beam, for example, to provide beam alignment and/or to provide different wobble patterns for cutting with different kerf widths. The laser cutting head includes a cutting nozzle for directing the laser beam together with a gas to a workpiece for cutting. The movable mirrors provide a wobbling movement of the beam within a relatively small field of view, for example, within an aperture of the cutting nozzle. The movable mirrors may be galvanometer mirrors that are controllable by a control system including a galvo
(Continued)

controller. The control system may also be used to control the fiber laser, for example, in response to the position of the beams relative to the workpiece and/or a sensed condition in the cutting head such as a thermal condition proximate one of the mirrors.

23 Claims, 6 Drawing Sheets

(51) Int. Cl.
| | |
|---|---|
| *B23K 26/08* | (2014.01) |
| *B23K 26/14* | (2014.01) |
| *B23K 26/16* | (2006.01) |
| *B23K 26/044* | (2014.01) |
| *G02B 26/10* | (2006.01) |
| *B23K 26/082* | (2014.01) |
| *G02B 27/30* | (2006.01) |
| *H01S 3/16* | (2006.01) |

(52) U.S. Cl.
CPC ........ *B23K 26/0648* (2013.01); *B23K 26/082* (2015.10); *B23K 26/083* (2013.01); *B23K 26/0821* (2015.10); *B23K 26/0869* (2013.01); *B23K 26/14* (2013.01); *B23K 26/1462* (2015.10); *B23K 26/16* (2013.01); *G02B 26/101* (2013.01); *G02B 26/105* (2013.01); *G02B 27/30* (2013.01); *H01S 3/1618* (2013.01)

(56) References Cited

U.S. PATENT DOCUMENTS

| | | | |
|---|---|---|---|
| 5,132,509 | A | 7/1992 | Hayakawa |
| 5,153,409 | A | 10/1992 | Rudaitis et al. |
| 5,249,192 | A | 9/1993 | Kuizenga et al. |
| 5,991,319 | A | 11/1999 | Zamel et al. |
| 8,415,584 | B2 | 4/2013 | Schuermann et al. |
| 8,498,037 | B2 | 7/2013 | Andreasch et al. |
| 10,751,835 | B2 * | 8/2020 | Grapov ................ B23K 26/242 |
| 2002/0170889 | A1 | 11/2002 | Faitel |
| 2002/0179582 | A1 * | 12/2002 | Reichmann ........ B23K 26/0665 219/121.84 |
| 2003/0055413 | A1 | 3/2003 | Altshuler |
| 2007/0170162 | A1 | 7/2007 | Haupt et al. |
| 2007/0221639 | A1 | 9/2007 | Yoshikawa |
| 2008/0049285 | A1 | 2/2008 | Pinard et al. |
| 2009/0032713 | A1 | 2/2009 | Bhatia |
| 2009/0144961 | A1 | 6/2009 | Pinard |
| 2009/0206066 | A1 | 8/2009 | Rekowski |
| 2009/0266801 | A1 | 10/2009 | Oku |
| 2009/0323739 | A1 * | 12/2009 | Elliott .................. B23K 26/082 372/24 |
| 2010/0072180 | A1 | 3/2010 | Schuermann |
| 2010/0078419 | A1 | 4/2010 | Johansen |
| 2011/0108533 | A1 | 5/2011 | Boettcher et al. |
| 2011/0297654 | A1 | 12/2011 | Yoshikawa et al. |
| 2012/0045169 | A1 | 2/2012 | Hu |
| 2013/0064706 | A1 | 3/2013 | Schwarze et al. |
| 2014/0263207 | A1 | 9/2014 | Liu |
| 2014/0291304 | A1 | 10/2014 | Mudd, II |
| 2015/0352668 | A1 | 12/2015 | Scott et al. |
| 2016/0193694 | A1 | 7/2016 | Dinkelman |

FOREIGN PATENT DOCUMENTS

| | | | | |
|---|---|---|---|---|
| JP | 2000263276 | | 9/2000 | |
| JP | 3126788 | | 11/2001 | |
| JP | 2003290944 | | 10/2003 | |
| JP | 2005279730 | A * | 10/2005 | |
| JP | 2010-162561 | | 7/2010 | |
| JP | 2010-162561 | A † | 7/2010 | |
| JP | 2011173146 | | 9/2011 | |
| JP | 2005279730 | | 10/2013 | |
| JP | 2015157297 | | 9/2015 | |
| WO | 2009-146697 | | 12/2009 | |
| WO | 2009/146697 | A † | 12/2009 | |
| WO | WO-2011154379 | A1 * | 12/2011 | ........... B23K 26/082 |
| WO | 2014138939 | | 9/2014 | |

OTHER PUBLICATIONS

Third-Party Submission Under 37 CFR 1.290 filed Jun. 27, 2019 in U.S. Appl. No. 16/076,151 (2 pgs); Third-Party Submission Under 37 CFR 1.290 Concise Description of Relevance (3 pgs); Third-Party Pre-Issuance Submission (33 pgs); and receipt of filing (3 pgs).

European Communication dated Apr. 4, 2019 in connection with correspondence European Patent Application Serial No. 16812628. 2.

PCT International Search Report and Written Opinion dated Oct. 27, 2016, received in corresponding PCT Application No. PCT/US16/ 38382, 11 pgs.

Notice of Allowance dated Apr. 20, 2020 in related U.S. Appl. No. 15/187,235.

International Search Report and Written Opinion, dated Apr. 24, 2017, in related International Application Serial No. PCT/US2017/ 017677, 12 pp.

Why and when to use expanders/collimators. Synrad 2013, <http:// www.synrad.com/synradinside/pdfs/Usingexpanders.pdf, 2 pp.

International Preliminary Report on Patentability, dated Aug. 23, 2018, in related International Application Serial No. PCT/US2017/ 017677, 10 pp.

Japanese Office Action dated Feb. 15, 2021 in corresponding Japanese Patent Application No. 2018-542142.

Cindy Goppold, Thomas Pinder, and Patrick Herwig of Fraunhofer IWS, De Gruyter, Advanced Optical Technologies, vol. 5, Issue 1, pp. 61-70, published online on Feb. 4, 2016(see https://www. degruyter.com/view/j/aot.2016.5.issue-1/aot-2015-0059/aot-2015-0059.xml?format=INT).†

\* cited by examiner
† cited by third party

LASER CUTTING HEAD WITH DUAL MOVABLE MIRRORS PROVIDING BEAM ALIGNMENT AND/OR WOBBLING MOVEMENT

CROSS-REFERENCE TO RELATED APPLICATIONS

The present application claims the benefit of U.S. Provisional Patent Application Ser. No. 62/294,744 filed Feb. 12, 2016, which is fully incorporated herein by reference. The present application is also related to U.S. Patent Application Pub. No. 2016/0368089, which is fully incorporated herein by reference.

TECHNICAL FIELD

The present invention relates to laser cutting and more particularly, to a laser cutting head including dual movable mirrors providing beam alignment and/or wobbling movement during cutting.

BACKGROUND INFORMATION

Lasers such as fiber lasers are often used for materials processing applications such as cutting. A conventional laser cutting head includes a collimator for collimating laser light, a focus lens for focusing the laser light to a workpiece or target area to be cut, and a cutting nozzle for directing gas to the workpiece. The laser beam is focused through the nozzle to melt the material of the workpiece and high pressure gas is directed through the nozzle to blow out the melted material. In such applications, the nozzle is generally positioned close to the workpiece being cut and a sensor may be used to monitor and maintain the nozzle position. The beam should also be aligned with the center of the nozzle, and such alignment is often made by adjusting the focus lens in an x, y direction. The focus lens may also be adjusted in a z direction, for example, to provide a bigger kerf to allow gas to go through when piercing and cutting a workpiece. Existing cutting heads do not allow the beam location and spot size to be quickly and easily adjusted for these cutting applications.

SUMMARY

Consistent with an embodiment, a laser cutting head includes a collimator configured to be coupled to an output fiber of a fiber laser and at least first and second movable mirrors configured to receive a collimated laser beam from the collimator and to move the beam in first and second axes within a limited field of view. The laser cutting head further includes a focus lens configured to focus the laser beam relative to a workpiece and a cutting nozzle for directing the focused laser beam and gas to the workpiece to be cut. The limited field of view corresponds to an aperture of the cutting nozzle.

Consistent with another embodiment, a laser cutting head includes a collimator configured to be coupled to an output fiber of a fiber laser and at least first and second movable mirrors configured to receive a collimated laser beam from the collimator and to move the beam in first and second axes. The laser cutting head further includes a focus lens configured to focus the laser beam relative to a workpiece without using a scanning lens and a cutting nozzle for directing the focused laser and gas to the workpiece to be cut.

Consistent with a further embodiment, a laser cutting head includes a collimator module including a collimator configured to be coupled to an output fiber of a fiber laser and a wobbler module coupled to the collimator module. The wobbler module includes at least first and second movable mirrors configured to receive a collimated laser beam from the collimator and to move the beam in first and second axes. A core block module is coupled to the wobbler module and includes a least a focus lens configured to focus the laser beam relative to a workpiece. A nozzle holder assembly is coupled to the core block module and includes a cutting nozzle for directing the focused laser beam and gas to the workpiece to be cut. The focused laser beam is moved within an aperture of the cutting nozzle.

Consistent with yet another embodiment, a laser cutting system includes a fiber laser including an output fiber and a laser cutting head coupled to the output fiber of the fiber laser. The laser cutting head includes a collimator configured to be coupled to an output fiber of a fiber laser and at least first and second movable mirrors configured to receive a collimated laser beam from the collimator and to move the beam in first and second axes within only a limited field of view. The laser cutting head further includes a focus lens configured to focus the laser beam relative to a workpiece and a cutting nozzle for directing the focused laser beam and gas to the workpiece to be cut. The limited field of view corresponds with an aperture of the cutting nozzle. The laser cutting system further includes a control system for controlling at least the fiber laser and positions of the movable mirrors.

Consistent with yet another embodiment, a laser cutting method includes: providing a laser cutting head including a collimator, first and second movable mirrors, a focus lens and a nozzle; generating a raw laser beam from a fiber laser; collimating the raw laser beam by passing the beam through the collimator; focusing the beam by passing the beam through the focus lens; directing the focused beam through the nozzle; moving the movable mirrors to align the beam within an aperture of the nozzle; directing gas through the nozzle to the workpiece; and moving the laser cutting head and the workpiece relative to each other to cut the workpiece Consistent with yet another embodiment, a laser cutting method includes: providing a laser cutting head including a collimator, first and second movable mirrors, a focus lens and a nozzle; generating a raw laser beam from a fiber laser; collimating the raw laser beam by passing the beam through the collimator; focusing the beam by passing the beam through the focus lens;

directing the focused beam through the nozzle; moving the movable mirrors to move the beam in a wobble pattern within an aperture of the nozzle; directing gas through the nozzle to the workpiece; and moving the laser cutting head and the workpiece relative to each other to cut the workpiece.

BRIEF DESCRIPTION OF THE DRAWINGS

These and other features and advantages will be better understood by reading the following detailed description, taken together with the drawings wherein.

DETAILED DESCRIPTION

A laser cutting head with movable mirrors, consistent with embodiments of the present disclosure, may be used to move a beam, for example, to provide beam alignment and/or to provide different wobble patterns for cutting with different kerf widths. The laser cutting head includes a cutting nozzle for directing the laser beam together with a gas to a workpiece for cutting. The movable mirrors provide a wobbling movement of the beam within a relatively small field of view, for example, within an aperture of the cutting nozzle. The movable mirrors may be galvanometer mirrors that are controllable by a control system including a galvo controller. The control system may also be used to control the fiber laser, for example, in response to the position of the beams relative to the workpiece and/or a sensed condition in the cutting head such as a thermal condition proximate one of the mirrors.

Figure 1:
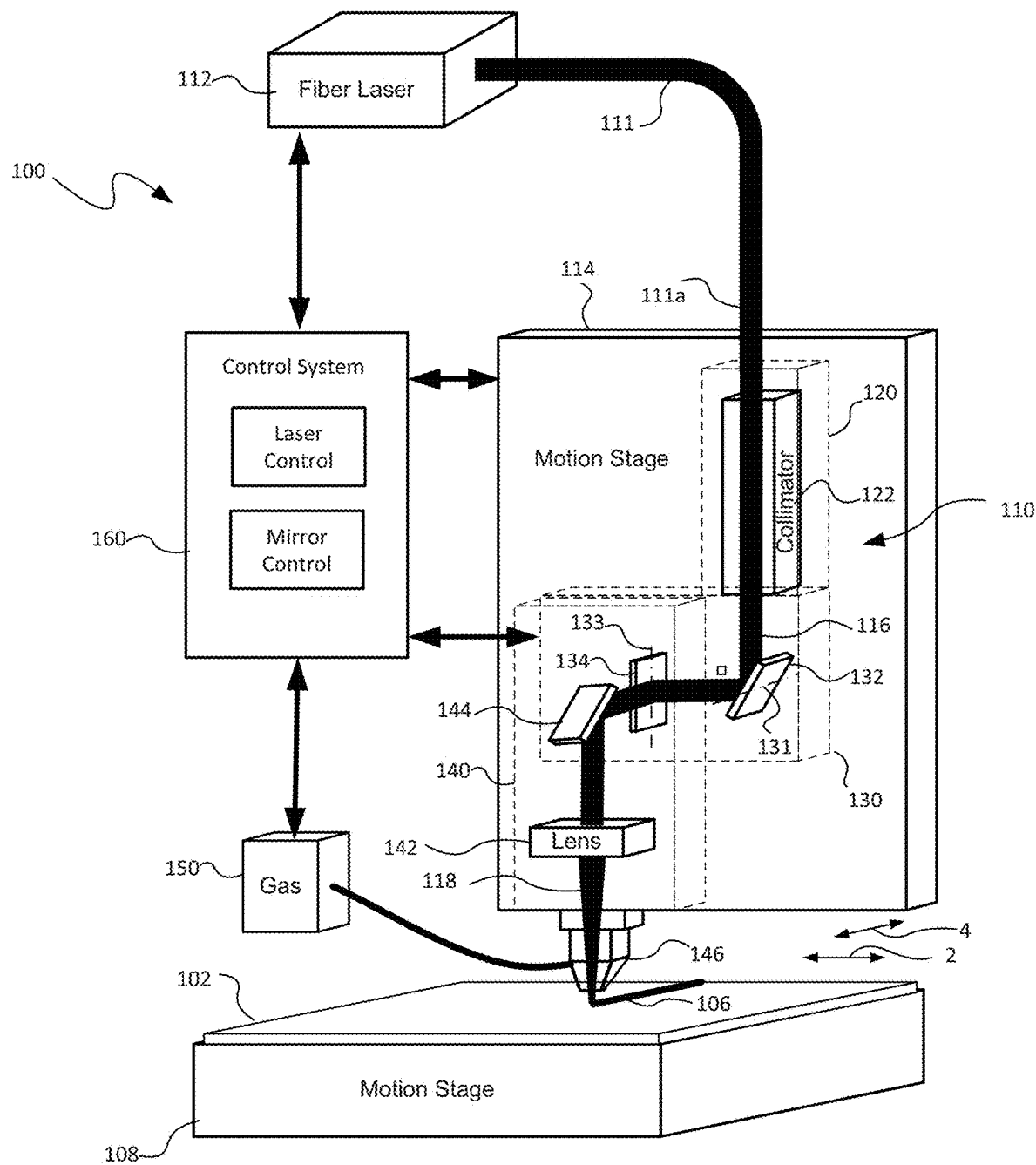
FIG. 1 is a schematic block diagram of a system including a laser cutting head with dual movable mirrors, consistent with an embodiment of the present disclosure.

Referring to FIG. 1, a laser cutting system 100 includes a laser cutting head 110 coupled to an output fiber 111 of a fiber laser 112 (e.g., with a connector 111a). The laser cutting head 110 may be used to perform cutting and other laser machining or processing operations on a workpiece 102. The laser cutting head 110 and/or the workpiece 102 may be moved relative to each other along the direction of a cut 106 (e.g., in the direction of axis 4). The cutting head 110 may be located on a motion stage 114 for moving the cutting head 110 relative to the workpiece 102 along at least one axis, for example, along the length of the cut 106. Additionally or alternatively, the workpiece 102 may be located on a motion stage 108 for moving the workpiece 102 relative to the laser cutting head 110.

The fiber laser 112 may include an Ytterbium fiber laser capable of generating a laser in the near infrared spectral range (e.g., 1060-1080 nm). The Ytterbium fiber laser may be a single mode or multi-mode continuous wave Ytterbum fiber laser capable of generating a laser beam with power up to 1 kW in some embodiments and higher powers up to 20 kW or higher in other embodiments. Examples of the fiber laser 112 include the YLR SM Series or YLR HP Series lasers available from IPG Photonics Corporation. The fiber laser 112 may also include a multi-beam fiber laser, such as the type disclosed in International Application No. PCT/US2015/45037 filed 13 Aug. 2015 and entitled Multibeam Fiber Laser System, which is capable of selectively delivering one or more laser beams through multiple fibers.

The laser cutting head 110 generally includes a collimator 122 for collimating the laser beam from the output fiber 111, at least first and second movable mirrors 132, 134 for reflecting and moving the collimated beam 116, and a focus lens 142 for focusing and delivering a focused beam 118 to the workpiece 102. In the illustrated embodiment, a fixed mirror 144 is also used to direct the collimated laser beam 116 from the second movable mirror 134 to the focus lens 142.

The laser cutting head 110 may further include a cutting nozzle assembly including a cutting nozzle 146 for directing the laser beam 118 together with a gas to the workpiece 102, such as the type known for use in laser cutting. The focus lens 142 focuses the collimated beam 116 through an aperture in the cutting nozzle 146. The cutting nozzle 146 is coupled to a gas source 150 for supplying the gas to the nozzle 146. The laser cutting head 110 may thus be used in a gas-assisted laser machining process. One type of gas-assisted laser machining process uses a laser to soften the material and uses a high pressure gas (e.g., nitrogen at 300 psi) to remove the material. Another type of gas-assisted laser machining process uses the laser to burn the material in the presence of a lower pressure gas (e.g., oxygen at 1-2 psi).

The collimator 122, the movable mirrors 132, 134, and the focus lens 142 and fixed mirror 144 may be provided in separate modules 120, 130, 140 that may be coupled together, as will be described in greater detail below. The laser cutting head 110 may also be constructed without the fixed mirror 144, for example, if the mirrors 132, 134 are arranged such that the light is reflected from the second mirror 134 toward the focus lens 142. One example of the cutting nozzle assembly is the type available from IPG Photonics Corporation for use with laser cutting heads. One example of the collimator module is the type available from IPG Photonics Corporation for use with laser cutting heads.

The movable mirrors 132, 134 are pivotable about different axes 131, 133 to cause the collimated beam 116 to move and thus to cause the focused beam 118 to move relative to the workpiece 102 in at least two different perpendicular axes 2, 4. The movable mirrors 132, 134 may be galvanometer mirrors that are movable by galvo motors, which are capable of reversing direction quickly. In other embodiments, other mechanisms may be used to move the mirrors such as stepper motors. Using the movable mirrors 132, 134 in the laser cutting head 110 allows the laser beam 118 to be moved precisely, controllably and quickly for purposes of alignment with an aperture in the nozzle 146 and/or beam wobbling to change the kerf width, without having to provide X, Y, Z adjustments of the focus lens 142 and without using a variable collimator.

In an embodiment of the cutting head 110, movable mirrors 132, 134 move the beam 118 within only a relatively small field of view (e.g., less than 30×30 mm) by pivoting the beam 118 within a scan angle α of less than 10° and more particularly about 1-2°, thereby allowing the beam to wobble. In contrast, conventional laser scan heads generally provide movement of the laser beam within a much larger field of view (e.g., larger than 50×50 mm and as large as 250×250 mm) and are designed to accommodate the larger field of view and scan angle. Thus, the use of the movable mirrors 132, 134 to provide only a relatively small field of view in the laser welding head 110 is counter-intuitive and contrary to the conventional wisdom of providing a wider field of view when using galvo scanners. Limiting the field of view and the scan angle provides advantages when using galvo mirrors in the cutting head 110, for example, by enabling faster speeds, allowing use with less expensive lenses and other components, and by allowing use with other accessories.

Because of the smaller field of view and scan angle in the example embodiment of the cutting head 110, the second mirror 134 may be substantially the same size as the first mirror 132. In contrast, conventional galvo scanners generally use a larger second mirror to provide for the larger field of view and scan angle and the larger second mirror may limit the speed of movement in at least one axis. A smaller sized second mirror 134 (e.g., about the same size as the first mirror 132) in the cutting head 110 thus enables the mirror 134 to move with faster speeds as compared to larger mirrors in conventional galvo scanners providing large scan angles.

The focus lens 142 may include focus lenses known for use in laser cutting heads and having a variety of focal lengths ranging, for example, from 100 mm to 1000 mm. Conventional laser scan heads use multi-element scanning lenses, such as an F theta lens, a field flattening lens, or a telecentric lens, with much larger diameters (e.g., a 300 mm diameter lens for a 33 mm diameter beam) to focus the beam within the larger field of view. Using such scanning lenses in a laser cutting head would be difficult. Because the movable mirrors 132, 134 are moving the beam within a relatively small field of view, a larger multi-element scanning lens (e.g., an F theta lens) is not required and not used. The focus lens 142 may also be adjustable in different axes.

Other optical components may also be used in the laser cutting head 110, such as a beam splitter for splitting the laser beam to provide at least two beam spots for cutting. Additional optical components may also include diffractive optics and may be positioned between the collimator 122 and the mirrors 132, 134. An axicon lens may also be used to create a ring or donut shaped beam. The lens assembly may also include a protective window (not shown) in front of the lens 142 to protect the lens and other optics from the debris produced by the cutting process.

The illustrated embodiment of the laser cutting system 100 further includes a control system 160 for controlling the fiber laser 112, the positioning of the movable mirrors 132, 134, and/or the motion stages 108, 114, for example, in response to sensed conditions in the cutting head 110, a detected location of the cut 106, and/or movement and/or position of the laser beam 118. The control system 160 may include both laser control and mirror control working together to control both the laser and the mirrors together. The control system 160 may include, for example, hardware (e.g., a general purpose computer) and software known for use in controlling fiber lasers and galvo mirrors. Existing galvo control software may be used, for example, and modified to allow the galvo mirrors to be controlled as described herein. The laser cutting system 100 may also include other controls, for example, as described in U.S. Patent Application Pub. No. 2016/0368089, which is fully incorporated herein by reference.

According to one method, the control system 160 may be used to move one or both of the mirrors 132, 134 to align the beam 118 with the aperture in the nozzle 146. Proper alignment of the beam may be determined using techniques known to those skilled in the art.

According to another method, the control system 160 may be used to move one or both of the mirrors 132, 134 to move the beam in a pattern that provides a larger kerf width during a laser machining operation. The kerf width may be adjusted, for example, within a range of about 150 to 300 microns. The kerf width may be controllably adjusted, for example, for different types of materials or for different thicknesses of materials being machined.

Figures 2A, 2B, 2C, 2D:
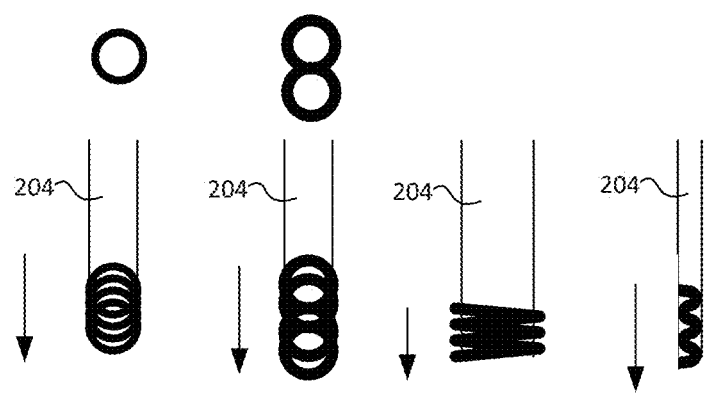
FIGS. 2A-2D are schematic diagrams illustrating different wobble patterns capable of being produced by a cutting head including dual movable mirrors, consistent with an embodiment of the present disclosure.

FIGS. 2A-2D illustrate examples of wobble patterns that may be used to increase a kerf width. As used herein, "wobble" refers to reciprocating movement of a laser beam (e.g., in two axes) and within a relatively small field of view defined by a scan angle of less than 10°. FIGS. 2A and 2B show a circular pattern and a figure 8 pattern, respectively, being formed and moved along a workpiece to form a cut 204. FIGS. 2C and 2D show a zig-zag pattern and an undulating pattern, respectively, being formed and moved along a workpiece to form a cut 204. Although certain wobble patterns are illustrated, other wobble patterns are within the scope of the present disclosure. One advantage of using the movable mirrors in the laser cutting head 110 is the ability to move the beam according to a variety of different wobble patterns.

Figure 3:
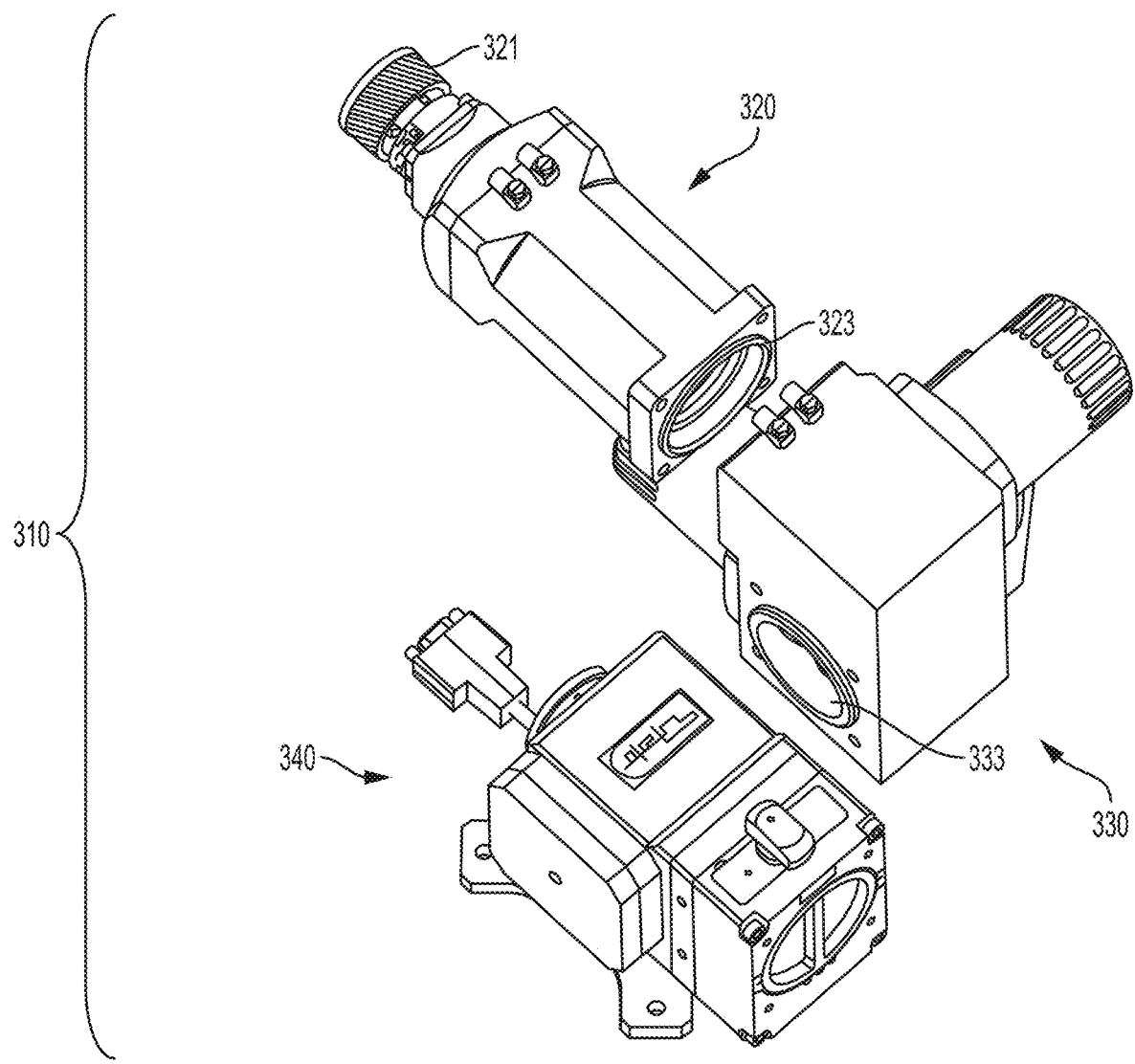
FIG. 3 is an exploded view of a laser cutting head with dual movable mirrors for beam movement, consistent with an embodiment of the present disclosure.

FIGS. 3-6 illustrate an embodiment of the laser cutting head 310 in greater detail. Although one specific embodiment is shown, other embodiments of the laser cutting head and systems and methods described herein are within the scope of the present disclosure. As shown in FIG. 3, the laser cutting head 310 includes a collimator module 320, a wobbler module 330, and a core block module 340. The wobbler module 330 includes the first and second movable mirrors as discussed above and is coupled between the collimator module 320 and the core block module 340. A cutting nozzle assembly (not shown) is mounted to the core block module 340.

As shown in FIG. 3, an input end 321 of the collimator module 320 is configured to be coupled to an output fiber connector (not shown) and an output end 323 of the collimator module 320 is configured to be coupled to the wobbler module 330. The collimator module 320 may include a collimator (not shown) with a fixed pair of collimator lenses such as the type known for use in laser cutting heads. In other embodiments, the collimator may include other lens configurations, such as movable lenses, capable of adjusting the beam spot size and/or focal point.

Figure 4:
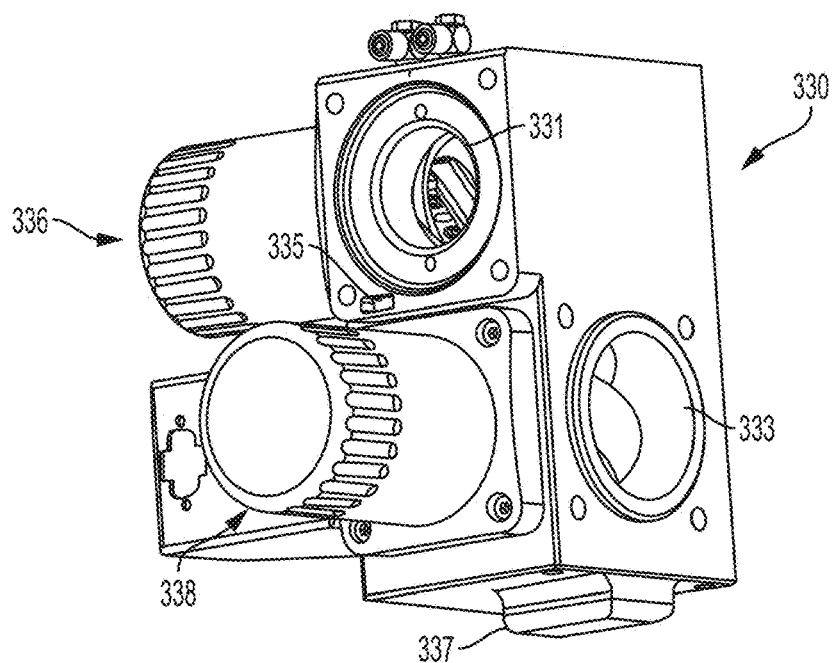
FIG. 4 is a perspective view of a wobbler module used in the laser cutting head shown in FIG. 3.
Figure 5:
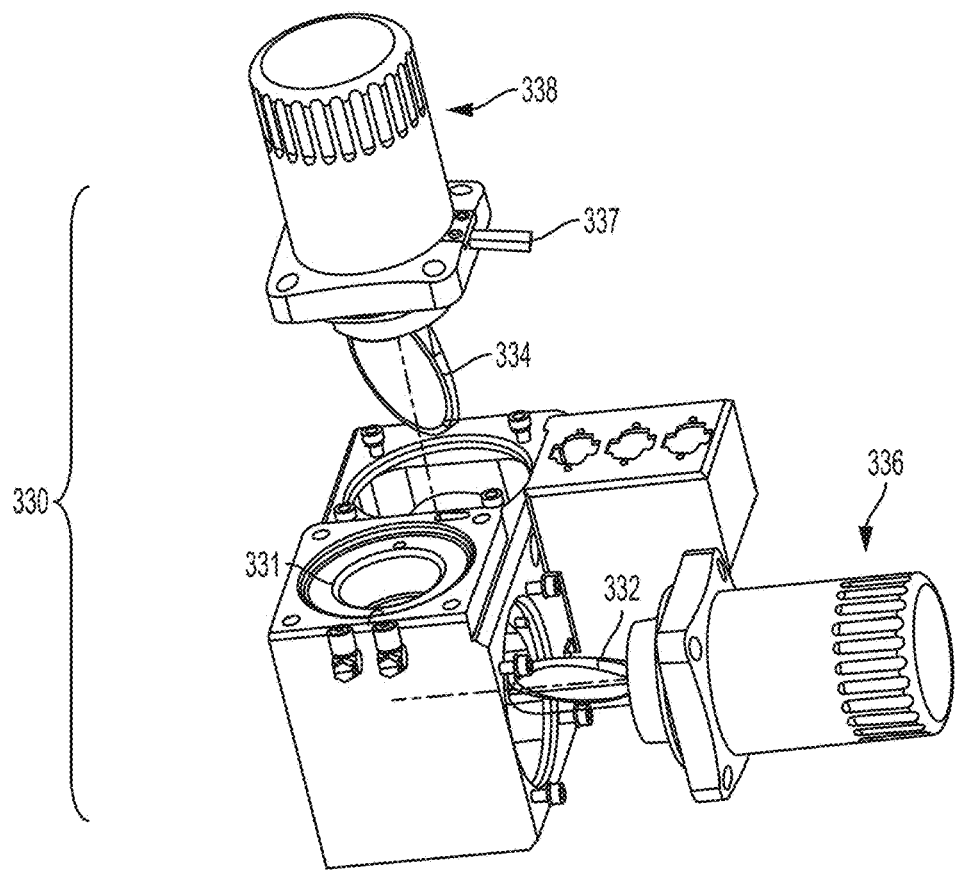
FIG. 5 is an exploded view of the wobbler module used in the laser cutting head shown in FIG. 3.

FIGS. 4-7 show the wobbler module 330 in greater detail. The illustrated embodiment of the wobbler module 430 includes an input aperture 331 for coupling to the collimator module 320 and an output aperture 333 for coupling to the core block module 340 (see FIG. 3). The input aperture 431 may include a water cooled limiting aperture. As shown in FIG. 5, the wobbler module 330 includes first and second galvanometers 336, 338 for moving galvo mirrors 332, 334 about different perpendicular axes. Galvanometers known for use in laser scanning heads may be used. The galvanometers 336, 338 may include connections 337 for connecting to a galvo controller (not shown). The galvo controller may include hardware and/or software for controlling the galvanometers to control movement of the mirrors and thus movement and/or positioning of the laser beam. Known galvo control software may be used and may be modified to provide the functionality described herein, for example, the beam alignment, the wobble patterns, and communication with the laser.

As shown in FIG. 4, the illustrated embodiment of the wobbler module 330 includes a fiber interlock connector 435 for connecting to a collimator fiber interlock connector (not shown) on the collimator module 320. The wobbler module 330 also includes a galvo fiber interlock connector 337 for connecting to the galvo controller. The safety interlock is thus extended to the wobbler module 330 and to the galvo controller. The galvo controller may be configured to trigger a safety interlock condition, for example, in response to sensed conditions within the wobbler module 330.

Figure 6:
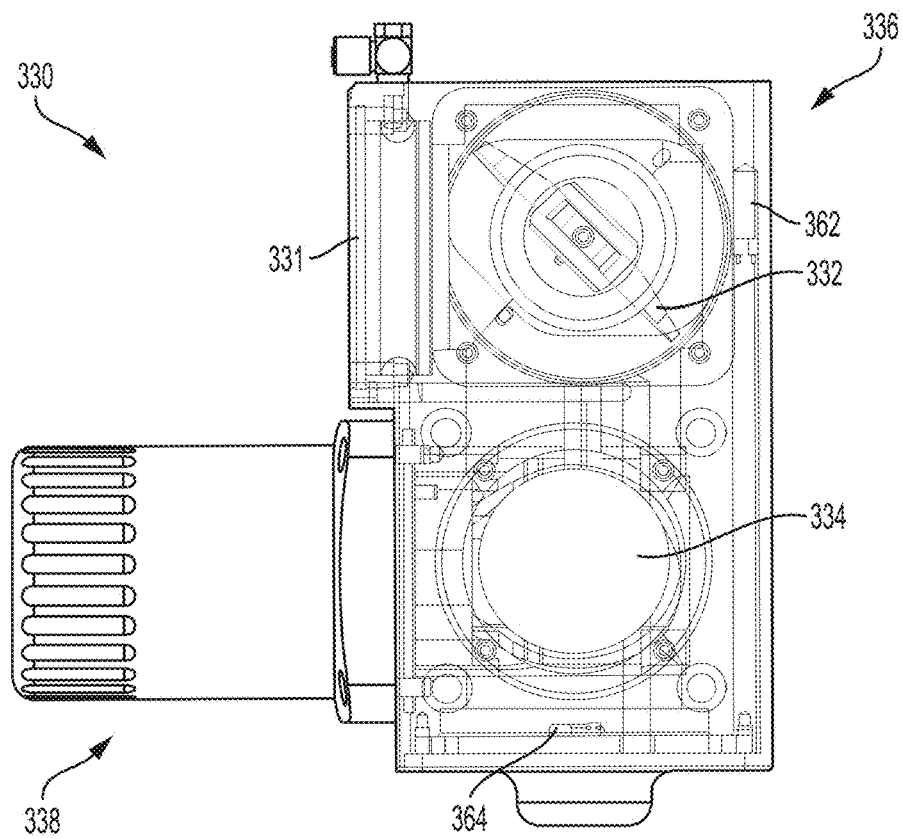
FIG. 6 is a partially cross-sectional view of the wobbler module used in the laser cutting head shown in FIG. 3 and showing the thermal sensors.
Figure 7:
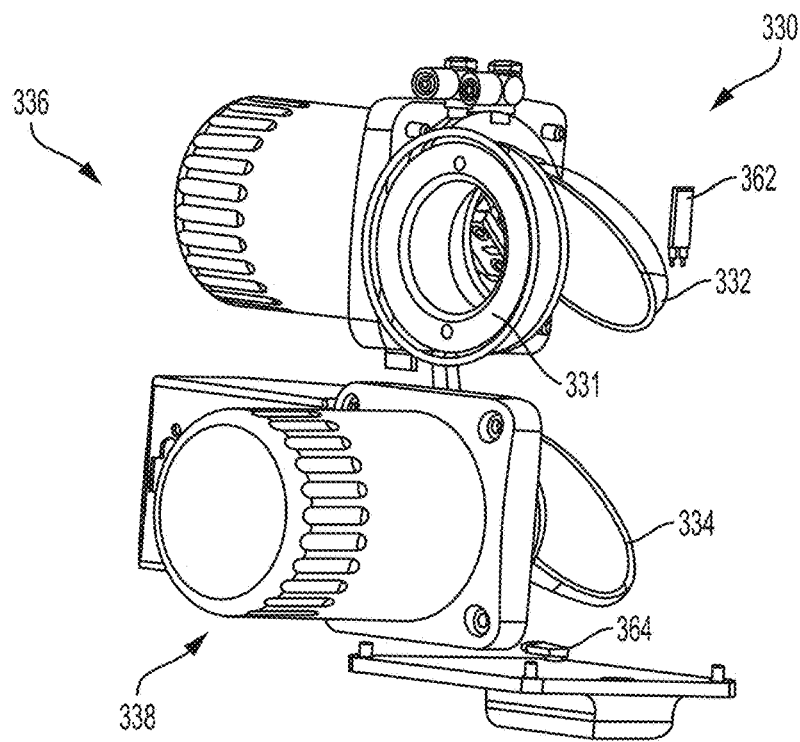
FIG. 7 is an exploded view of the wobbler module with a water cooled limiting aperture.

As shown in FIGS. 6 and 7, the illustrated embodiment of the wobbler module 330 also includes thermal probes 362, 364 proximate each of the respective mirrors 332, 334. The thermal probes 362, 364 sense a thermal condition (e.g., temperature) at the respective locations within the wobbler module 330 and may be connected via the galvo connections 337 to the galvo controller. The galvo controller may thus monitor the thermal probes 362, 364 to determine if a predefined condition occurs, such as a high temperature indicating a potentially hazardous condition within the wobbler module 330. If one of the movable mirrors 332, 334 malfunctions, for example, the high power laser directed into the wobbler module 330 may not be reflected properly and may cause the hazardous condition. The galvo controller may thus trigger the safety interlock to shut down the laser in response to the hazardous condition. The thermal probes may include known sensors such as bimetal strips inside of ceramic.

Figure 8:
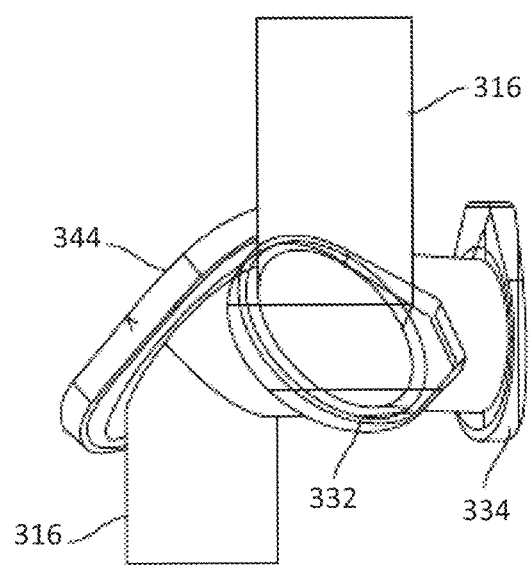
FIG. 8 is a schematic diagram of the beam path within the wobbler module shown in FIG. 4.

FIG. 8 shows the path of a collimated beam 316 inside of the wobbler module and the core block module when coupled together. As shown, the collimated beam 316 input to the wobbler module is reflected from the first galvo mirror 332 to the second galvo mirror 334 and then reflected from the fixed mirror 344 inside the core block module and output from the core block module. The fixed mirror 344 may be an infrared mirror to allow use with a camera for monitoring the beam 316.

Accordingly, a laser cutting head with movable mirrors, consistent with embodiments described herein, allows improved control over the alignment and the movement of a laser beam used for various cutting applications such as gas assisted cutting.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser cutting head comprising:
   a collimator configured to be coupled to an output fiber of a fiber laser;
   at least first and second movable mirrors configured to receive a collimated laser beam from the collimator and to move the beam within a limited field of view defined by a scan angle of 1-2°, wherein the movable mirrors are coupled to a mirror control to control movement of the mirrors with the scan angle of 1-2° to move the beam in a wobble pattern within the limited field of view;
   a focus lens configured to focus the laser beam relative to a workpiece; and
   a cutting nozzle for directing the focused laser beam and gas to the workpiece to be cut, wherein the limited field of view corresponds to an aperture of the cutting nozzle;
   wherein the collimator is included in a collimator module, wherein the focus lens is included in a core block module, wherein the mirrors are included in a wobbler module, and wherein the wobbler module is coupled between the core block module and the collimator module.

2. The laser cutting head of claim 1 wherein the movable mirrors are configured to move the beam within only a limited field of view having a dimension less than 30×30 mm.

3. The laser cutting head of claim 1 wherein the focus lens is not a scanning lens.

4. The laser cutting head of claim 1 wherein the movable mirrors are galvanometer mirrors.

5. The laser cutting head of claim 1 wherein the movable mirrors are the same size.

6. The laser cutting head of claim 1 further comprising a fixed mirror configured to reflect the laser beam from the movable mirrors to the focus lens.

7. A laser cutting head comprising:
   a collimator configured to be coupled to an output fiber of a fiber laser;
   at least first and second movable mirrors configured to receive a collimated laser beam from the collimator and to move the beam within a limited field of view defined by a scan angle of 1-2°, wherein the movable mirrors are coupled to a mirror control to control movement of the mirrors with the scan angle of 1-2°;
   a focus lens configured to focus the laser beam relative to a workpiece without using a scanning lens; and
   a cutting nozzle for directing the focused laser and gas to the workpiece to be cut, wherein the limited field of view corresponds to an aperture of the cutting nozzle;
   wherein the collimator is included in a collimator module, wherein the focus lens is included in a core block module, wherein the mirrors are included in a wobbler module, and wherein the wobbler module is coupled between the core block module and the collimator module.

8. A laser cutting head comprising:
   a collimator module including a collimator configured to be coupled to an output fiber of a fiber laser;
   a wobbler module coupled to the collimator module, the wobbler module including at least first and second movable mirrors configured to receive a collimated laser beam from the collimator and to move the beam within a limited field of view defined by a scan angle of 1-2°, wherein the movable mirrors are coupled to a mirror control to control movement of the mirrors within the scan angle of 1-2° to move the beam in a wobble pattern within the limited field of view;
   a core block module coupled to the wobbler module, the core block module including at least a focus lens configured to focus the laser beam relative to the workpiece; wherein the wobbler module is coupled between the core block module and the collimator module; and
   a nozzle holder assembly coupled to the core block module and including a cutting nozzle for directing the focused laser beam and gas to the workpiece to be cut, wherein the focused laser beam is moved within an aperture of the cutting nozzle that corresponds to the limited field of view.

9. The laser cutting head of claim 8 wherein the wobbler module includes first and second galvo modules including galvanometer mirrors, wherein the galvanometer mirrors are the same size, and wherein the galvo modules are configured to be connected to a galvo controller.

10. The laser cutting head of claim 8 wherein the movable mirrors are configured to move the beam within only a limited field of view having a dimension less than 30×30 mm.

11. A laser cutting system comprising:
   a fiber laser including an output fiber;
   a laser cutting head coupled to the output fiber of the fiber laser, the laser cutting head comprising:
      a collimator configured to be coupled to the output fiber of the fiber laser;

at least first and second movable mirrors configured to receive a collimated laser beam from the collimator and to move the beam within only a limited field of view defined by a scan angle of 1-2°;
a focus lens configured to focus the laser beam relative to a workpiece; and
a cutting nozzle for directing the focused laser beam and gas to the workpiece to be cut, wherein the limited field of view corresponds with an aperture of the cutting nozzle; and
wherein the collimator is included in a collimator module, wherein the focus lens is included in a core block module, wherein the mirrors are included in a wobbler module, and wherein the wobbler module is coupled between the core block module and the collimator module; and
a control system for controlling at least the fiber laser and positions of the movable mirrors, the control system including a mirror control to control movement of the mirrors with the scan angle of 1-2° to move the beam in a wobble pattern within the limited field of view.

12. The laser cutting system of claim 11 wherein the fiber laser includes an Ytterbium fiber laser.

13. The laser cutting system of claim 11 wherein the control system is configured to control the positions of the movable mirrors to align the focused laser beam in the aperture of the cutting nozzle.

14. The laser cutting system of claim 11 wherein the wobble pattern is selected from a group consisting of a circular pattern, a figure 8 pattern, an undulating pattern and a zig zag pattern.

15. The laser cutting system of claim 11 further comprising a motion stage for moving at least one of the laser cutting head and a workpiece such that the laser beam cuts the workpiece.

16. The laser cutting system of claim 11 wherein the focus lens is not a scanning lens.

17. The laser cutting system of claim 11 wherein the movable mirrors are galvanometer mirrors.

18. The laser cutting system of claim 11 wherein the movable mirrors are the same size.

19. A laser cutting method comprising:
providing a laser cutting head including a collimator, first and second movable mirrors, a focus lens and a nozzle, wherein the collimator is included in a collimator module, wherein the focus lens is included in a core block module, wherein the mirrors are included in a wobbler module, and wherein the wobbler module is coupled between the core block module and the collimator module;
generating a raw laser beam from a fiber laser;
collimating the raw laser beam by passing the beam through the collimator;
focusing the beam by passing the beam through the focus lens;
directing the focused beam through the nozzle;
moving the movable mirrors to align the beam within an aperture of the nozzle and to move the beam within a limited field of view defined by a scan angle of 1-2° within the aperture of the nozzle, wherein the limited field of view corresponds with the aperture of the nozzle;
directing gas through the nozzle to the workpiece; and
moving the laser cutting head and the workpiece relative to each other to cut the workpiece.

20. The laser cutting method of claim 19 further comprising moving the movable mirrors to move the beam in a wobble pattern within the aperture of the nozzle.

21. A laser cutting method comprising:
providing a laser cutting head including a collimator, first and second movable mirrors, a focus lens and a nozzle, wherein the collimator is included in a collimator module, wherein the focus lens is included in a core block module, wherein the mirrors are included in a wobbler module, and wherein the wobbler module is coupled between the core block module and the collimator module;
generating a raw laser beam from a fiber laser;
collimating the raw laser beam by passing the beam through the collimator;
focusing the beam by passing the beam through the focus lens;
directing the focused beam through the nozzle;
moving the movable mirrors to move the beam within a limited field of view defined by a scan angle of 1-2° in a wobble pattern within an aperture of the nozzle, wherein the limited field of view corresponds with the aperture of the nozzle;
directing gas through the nozzle to the workpiece; and
moving the laser cutting head and the workpiece relative to each other to cut the workpiece.

22. The laser cutting method of claim 21 further comprising changing the wobble pattern to adjust a kerf width.

23. The laser cutting method of claim 21 wherein the wobble pattern is a circular pattern or a FIG. 8 pattern.

* * * * *